United States Patent Office 3,364,240
Patented Jan. 16, 1968

3,364,240
4-AMINOBENZENE-SULFONYL-AMINOETHYL-ISOTHIURONIUM SALTS
Edwin Baier and Henning Lübbers, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 1, 1963, Ser. No. 312,854
Claims priority, application Germany, Oct. 3, 1962, F 37,955
6 Claims. (Cl. 260—397.7)

The present invention relates to novel 4-aminobenzene-sulfonyl-aminoethyl-isothiuronium salts and to a process for their manufacture; more particularly it relates to 4-aminobenzene-sulfonylaminoethyl - isothiuronium salts of the general Formula I

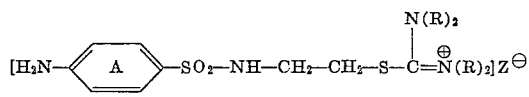

in which the benzene nucleus A may be substituted by halogen atoms, low molecular weight alkyl groups or alkoxy groups, R stands for a hydrogen atom or an alkyl group and $Z^{\ominus}$ is the anion of an inorganic or organic acid.

Now it as been found that 4-aminobenzene-sulfonyl-aminoethyl isothiuronium salts of the general Formula I

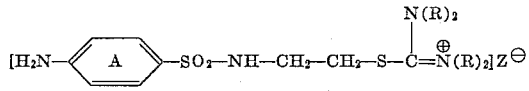

in which A, R, and $Z^{\ominus}$ have the meaning defined above, can be prepared by reacting 4-aminobenzene-sulfethylene imides of the general Formula II

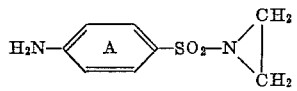

in which the benzene nucleus A may be substituted by halogen atoms, low molecular weight alkyl groups or alkoxy groups, with thiourea or the N- or N,N'-alkyl derivatives thereof in the presence of inorganic or organic acids in polar solvents.

Suitable starting compounds of the general formula mentioned above are, for example 4-aminobenzene-sulfethylene imide, 4-amino-5-methoxy-benzene-sulfethylene imide, 4-amino-2-methyl-5-methoxy-benzene - sulfethylene imide or 4-amino-2,5-dichlorobenzene - sulfethylene imide.

As N-alkyl derivatives of thiourea there may be used, for example, N-methyl-thiourea, N,N'-dimethyl-thiourea and N,N'-tetramethyl-thiourea.

Inorganic or organic acids to be used in the present process are, for example, hydrochloric acid, sulfuric acid, phosphoric acid, nitric acid, formic acid, acetic acid or oxalic acid. The acids are to be used in an amount of at least 1 mol of acid for 1 mol of starting compound of the general Formula II.

Suitable polar solvents are, for example, water, low molecular weight aliphatic alcohols, such as methanol or ethanol, acetone, nitrobenzene or methylene chloride.

The reaction is carried out at a temperature in the range of from about 20° to 60° C. When water or nitrobenzene are used the upper range is especially suitable, with the use of polar, water-soluble organic solvents the lower range of the temperature interval shall preferably be applied.

Owing to the fact that aryl-sulfethylene imides represent unstable substances which polymerize to yield high molecular weight compounds (cf. Houben-Weyl, "Methoden der Organischen Chemie," vol. XI, 2 (1958), page 236) it was surprising that under the conditions of the present process 4-aminobenzene-sulfethylene imides react with thiourea and the N-alkyl derivatives thereof, in most cases with good yields, with the formation of the corresponding isothiuronium compounds.

The aromatic amines containing isothiuronium groups and obtained by the process of the invention are valuable intermediate products for the manufacture of dyestuffs and textile auxiliaries.

The primary aromatic amines obtainable by the process of the invention can be diazotized and coupled with suitable coupling components to yield azo dyestuffs which can be used for producing fast dyeings on vegetable and animal fibers.

The following examples serve to illustrate the invention but they are not intended to limit it thereto, the parts being by weight unless otherwise stated and the relationship of parts by weight to parts by volume being the same as that of the kilogram to the liter.

EXAMPLE 1

20 parts of 4-aminobenzene-sulfethylene imide, 8 parts of thiourea and 12 parts of glacial acetic acid were introduced while stirring into 100 parts by volume of acetone. The mixture was then stirred for 15 hours at room temperature. The precipitate formed was filtered off, the solid matter was introduced into 300 parts by volume of water and the mixture was stirred for 30 minutes at 20° C. The undissolved residue was filtered off, the filtrate was clarified with active carbon and concentrated to dryness by evaporation under reduced pressure. The residue was stirred into 30 parts by volume of acetone. The mixture was stirred for 1 hour at room temperature, the crystalline precipitate was filtered off, washed with 10 parts by volume of acetone and dried at 30–40° C. 25 parts of 4-aminobenzene-sulfonyl-aminoethyl-isothiuronium acetate were obtained, corresponding to a theoretical yield of 75%. The product melted at 107–109° C. with decomposition.

If the reaction was carried out with the same amount of methanol or ethanol instead of acetone, 4-aminobenzene - sulfonylaminoethyl - isothiuronium acetate was likewise obtained in a good yield.

EXAMPLE 2

20 parts of 4-aminobenzene-sulfethylene imide, 8 parts of thiourea and 100 parts by volume of 2 N $H_2SO_4$ were stirred for 15 hours at 50° C. The reaction mixture was then diluted with water to 300 parts by volume, the precipitate was filtered off and the filtrate was concentrated to dryness by evaporation at 60° C. under reduced pressure. The residue was stirred with 50 parts by volume of acetone, washed with 20 parts by volume of acetone and dried at 40° C. 33 parts of 4-aminobenzene-sulfonylaminoethyl-isothiuronium sulfate corresponding to a yield of 90% of the theory were obtained. The product melted at 186°–190° C. with decomposition.

By using, instead of 100 parts by volume of 2 N $H_2SO_4$, the same amount by volume of 2 N $HNO_3$ and neutralizing with 2 N NaOH while cooling with ice prior to the evaporation of water, 31 parts of crude 4 - aminobenzene - sulfonylaminoethyl - isothiuronium nitrate corresponding to a yield of 67% of the theory were obtained. After purification with acetone the compound melted at 119°–121° C. with decomposition.

EXAMPLE 3

20 parts of 4-aminobenzene-sulfethylene imide, 8 parts of thiourea and 12 parts by volume of glacial acetic acid were introduced into 100 parts by volume of nitrobenzene. The mixture was heated to 80° C. while stirring, kept at that temperature for 5 minutes and then heated for 4 hours at 60° C. After cooling the precipitate was filtered off, stirred in 100 parts by volume of benzene and again filtered off. In order to remove the unreacted portion the reaction product was stirred for 30 minutes in 200 parts by volume of water, the water-insoluble residue was filtered off and the filtrate was concentrated to dryness by evaporation under reduced pressure. 28 parts of crude 4-aminobenzene-sulfonylamino-ethyl-isothiuronium acetate corresponding to a yield of 80% of the theory were obtained. After purification in acetone the compound melted at 118°–121° C. with decomposition.

If, instead of nitrobenzene, methylene chloride was used and the reaction was carried out for 2 hours at the boiling point of methylene chloride, 4-aminobenzene-sulfonyl-aminoethyl-isothiuronium acetate was obtained in a yield to 78% of the theory.

EXAMPLE 4

61 parts of 4-amino-2-methyl-5-methoxybenzene-sulfethylene imide and 20 parts of thiourea were introduced into 250 parts by volume of 2 N acetic acid. The mixture was heated to 50° C. and kept at that temperature for 12 hours. The whole was made up to 500 parts by volume with water, the residue was separated by filtration, the filtrate was clarified with active carbon, and the water was evaporated at 50° C. under reduced pressure. The residue was stirred with 250 parts by volume of ethyl acetate, filtered off and dried at 40° C. 24 parts of very pure, white and crystalline 4-amino-2-methyl-5-methoxybenzene-sulfonylaminoethyl-isothiuronium acetate were obtained which melted at 115°–116° C. with decomposition.

EXAMPLE 5

198 parts (1 mol) of 4-aminobenzene-sulfethylene imide and 76 parts (1 mol) of thiourea were stirred in 1000 parts of 2 N CH₃COOH for 15 hours at 50° C. A small amount of residue was filtered off, 2000 parts by volume of water were added, the reaction mixture was clarified with active carbon and the filtrate was concentrated under reduced pressure and at 50° C. to about 120 parts by volume. 500 parts by volume of acetone were added, the mixture was stirred for about 1 hour at room temperature, the crystalline precipitate was filtered off, washed with 200 parts by volume of acetone and dried at 30–40° C. 162 parts of 4-aminobenzene-sulfonylaminoethyl-isothiuronium acetate were obtained melting at 114° C. with decomposition.

33.4 parts of the salt thus obtained were dissolved in 320 parts by volume of water. 15 parts by volume of a 40% sodium nitrite solution were added and the mixture obtained was introduced into 250 parts of ice and 28 parts by volume of concentrated hydrochloric acid. The whole was stirred for 10 minutes and the sodium nitrite in excess was then destroyed by the addition of amidosulfonic acid. The pH value of the diazo solution obtained was adjusted to 5 by adding sodium acetate.

The diazo solution was dropped, while stirring, into a fine dispersion of the azo component obtained by dissolving 16.8 parts of 1,5-bis-(acetoacetylamino)-2,4-dimethoxybenzene in 100 parts by volume of 1 N NaOH and subsequently neutralizing with 2 N CH₃COOH.

A yellow dyestuff of the following formula

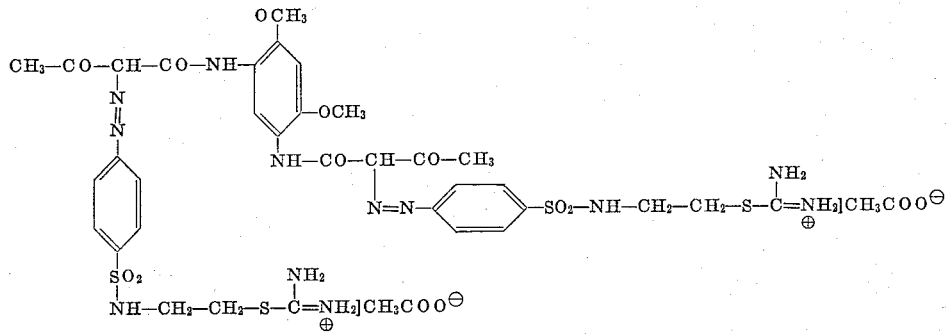

was obtained which could be used for dyeing cellulose materials. The yellow reddish colorations obtained were distinguished by very good properties to wet processing.

EXAMPLE 6

61 parts of 4-amino-2-methyl-5-methoxybenzene-sulfethylene imide and 20 parts of thiourea were introduced into 125 parts by volume of 2 N hydrochloric acid. The mixture was heated to 50° C. and kept at that temperature for 12 hours. The whole was made up to 500 parts by volume by adding water, the remaining residue was filtered off, the filtrate was clarified with active carbon and the water was evaporated at 50° C. under reduced pressure. The residue was stirred with 250 parts by volume of ethyl acetate, filtered off and dried at 40° C. A good yield of 4-amino-2-methyl-5-methoxy-benzene-sulfonyl-aminoethyl-isothiuronium chloride was obtained.

EXAMPLE 7

68 parts of 4-amino-2,5-dichlorobenzene-sulfethylene imide and 20 parts of thiourea were heated for 15 hours at 50° C. in 250 parts by volume of 2 N acetic acid. The treatment was continued as described in Example 4. A good yield of 4-amino-2,5-dichlorobenzene-sulfonylamino-ethyl-isothiuronium acetate was obtained.

We claim:
1. A 4-aminobenzene-sulfonylaminoethyl-isothiuronium salt of the formula

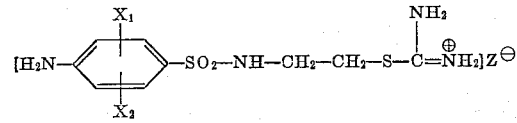

wherein X₁, X₂ represent members of the group consisting of hydrogen, chlorine, lower alkyl and lower alkoxy, and Z represents the anion of hydrochloric, sulfuric, phosphoric, nitric, formic, acetic or oxalic acid.

2. The compound of the formula

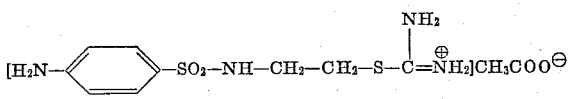

3. The compound of the formula

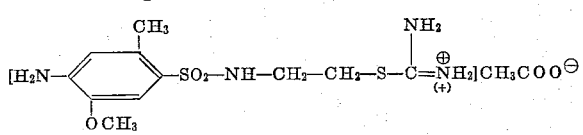

4. The compound of the formula

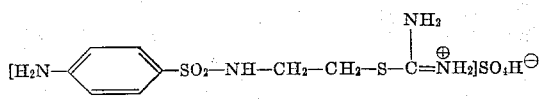

5. The compound of the formula

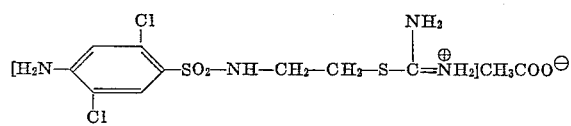

6. The compound of the formula

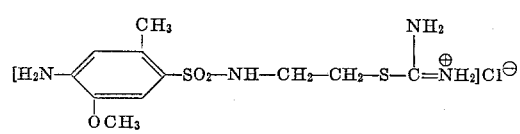

References Cited

Chemical Abstracts, vol. 53, col. 19953d, abstracts of article by Portnyagina (1959).
Chemical Abstracts, vol. 54, col. 12090b, abstracts of article by Brois (1960).
Elderfield, Heterocyclic Compounds, vol. 1, pp. 68–70 (1950).
Bestian, Leibig's Annalen der Chemie, pp. 223–29, vol. 566 (1950).

JAMES A. PATTEN, *Primary Examiner.*

JOHN D. RANDOLPH, WALTER A. MODANCE, *Examiners.*

H. I. MOATZ, *Assistant Examiner.*